Figure 1:
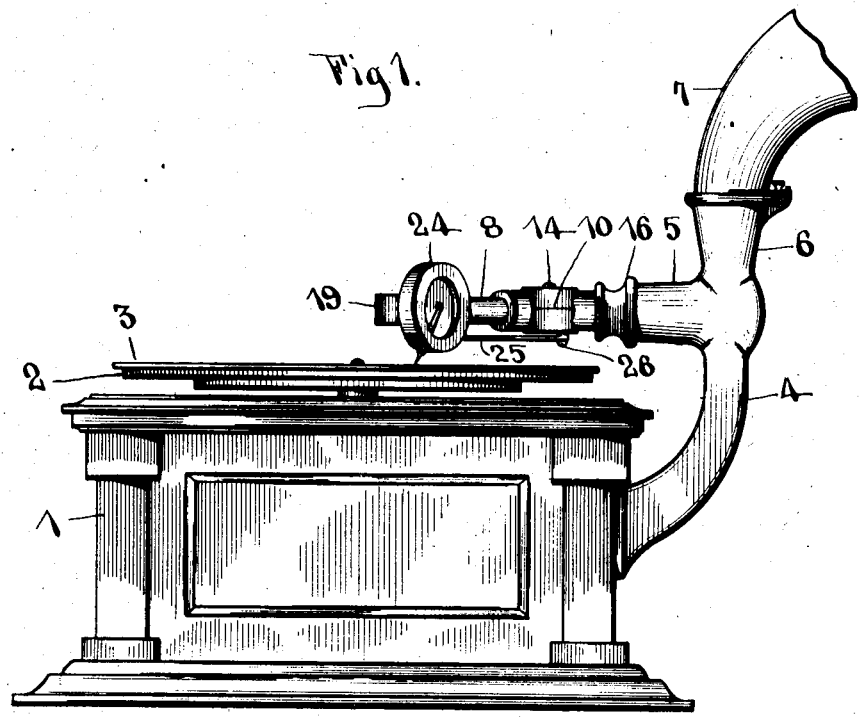

No. 834,511. PATENTED OCT. 30, 1906.
J. C. ENGLISH.
TALKING MACHINE.
APPLICATION FILED NOV. 12, 1904.

2 SHEETS—SHEET 1.

WITNESSES:
F. J. Hartman
Edw. W. Vaill Jr.

INVENTOR
John C. English
BY
ATTORNEY.

No. 834,511. PATENTED OCT. 30, 1906.
J. C. ENGLISH.
TALKING MACHINE.
APPLICATION FILED NOV. 12, 1904.
2 SHEETS—SHEET 2.
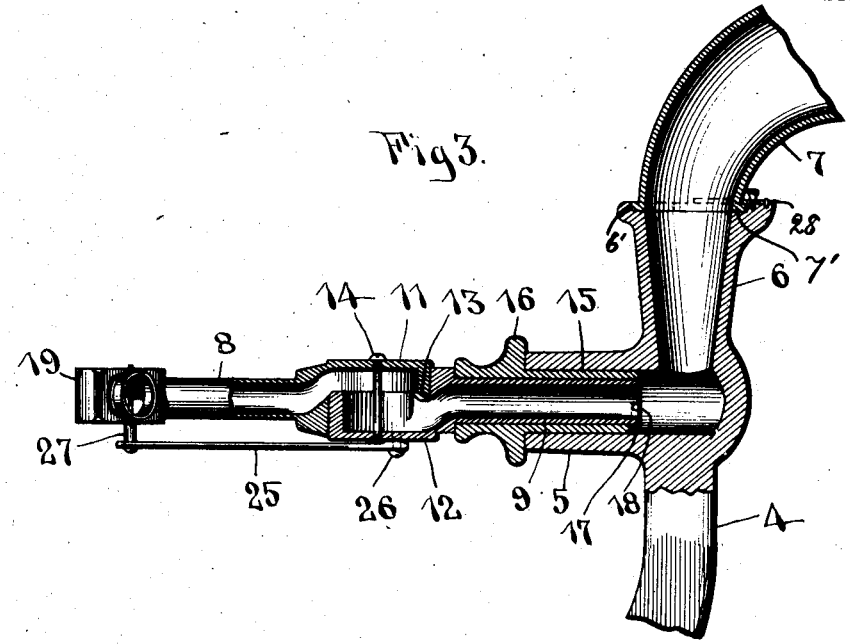
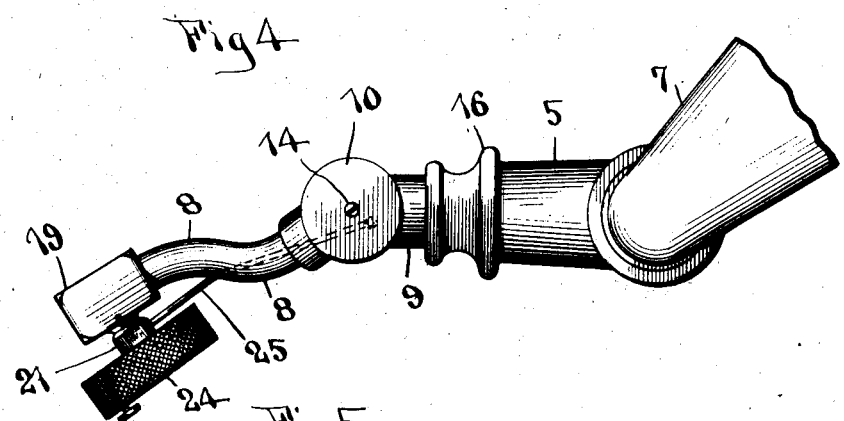
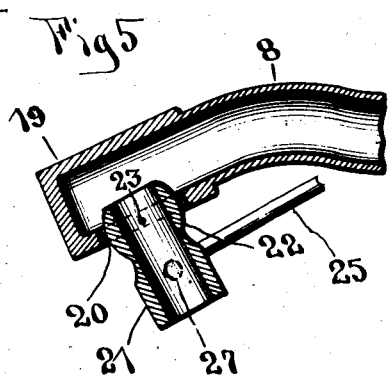
WITNESSES:
INVENTOR
John C. English
BY
ATTORNEY.

UNITED STATES PATENT OFFICE.

JOHN C. ENGLISH, OF CAMDEN, NEW JERSEY, ASSIGNOR TO VICTOR TALKING MACHINE COMPANY, A CORPORATION OF NEW JERSEY.

TALKING-MACHINE.

No. 834,511.　　　　Specification of Letters Patent.　　　　Patented Oct. 30, 1906.

Application filed November 12, 1904. Serial No. 232,387.

*To all whom it may concern:*

Be it known that I, JOHN C. ENGLISH, a citizen of the United States, and a resident of the city of Camden, State of New Jersey, have invented certain new and useful Improvements in Talking-Machines, of which the following is a full, clear, and complete disclosure.

The object of my invention is to provide such a construction in connection with talking-machines or other similar sound recording and reproducing machines that the sound-box will at all times in traversing the grooves of the record be held accurately in such a position that the plane of the stylus or needle will be substantially tangent to the direction of rotation of a turn-table, and, therefore, tangent to the turns of the record-groove.

Heretofore in talking-machines the arm which supports the reproducing mechanism has usually been pivoted upon a vertical pivot, which causes the sound-box to swing in the arc of a circle about said pivot, and as the proper line on which the sound-box and needle should move in traversing a record of the disk type is a radius or straight line toward the center of the record it is evident that the stylus of the sound-box or reproducer in such former constructions would be in a plane tangent to the record-grooves at only one point in its movement across the record. This relation between the stylus or needle and the record-grooves seems to interfere somewhat with an accurate reproduction of the sounds recorded on the record, especially at the beginning and ending of the record, because the stylus-bar was not actuated in a direction exactly at right angles to the plane of the diaphragm.

My invention has substantially overcome this difficulty, and by its use the stylus is forced to move in substantially a straight line across the face of the record, said straight line being a radius, while at the same time the plane of the needle or stylus, as well as the sound-box diaphragm, are substantially in planes tangent to the record-groove on the radius referred to.

Briefly, my invention comprises an arm for supporting the reproducing mechanism which is composed of two parts jointed or pivoted together, the sound-box also being pivoted in relation to the parts of said supporting-arm, and also means for connecting the sound-box with a fixed point, so that said sound-box is held accurately and firmly in its correct position while traversing the entire width of the record.

Figure 2:
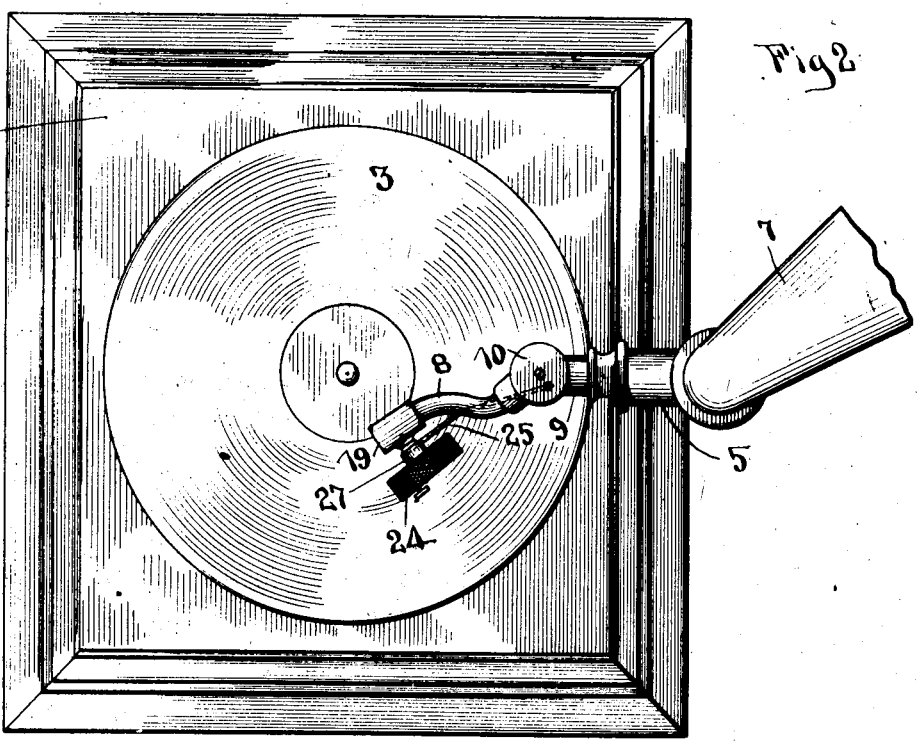

For a full, clear, and exact description of one embodiment of my invention reference may be had to the following specification and to the accompanying drawings, forming a part thereof, in which Figure 1 is a side elevation of a talking-machine, showing my improved device in use in connection therewith. Fig. 2 is a plan view of the same. Fig. 3 is a longitudinal sectional view of the supporting-arm detached from the other parts of the machine and showing the manner of joining the sections of said arm. Fig. 4 is a detailed plan view of the same, and Fig. 5 is a sectional view showing the manner of forming the joint between the sound-box and the supporting-arm.

Referring to the drawings, the numeral 1 indicates a casing for the talking-machine motor, above which is revolubly carried the turn-table 2, adapted to receive the usual disk-record 3. At one side of the casing 1 is fixed an upwardly-extending arm or bracket 4, which has a horizontal tubular portion 5 connected therewith, and also a vertical tubular portion 6, recessed, as at 6', to receive the amplifying-horn 7, which is provided with a flanged end 7', adapted to be seated in the said recess 6'. A yoke or plate 28, secured to the upper end of the vertical tubular portion 6, embraces the upper surface of the flange 7' and, holding the horn in position within said recess 6', permits the horn to be swung horizontally about the upper end of said bracket 4.

The supporting-arm for the reproducer consists primarily of two hollow sections or tubes 8 and 9, which are jointed, as at 10, by means of two cylindrical boxes or casings 11 and 12, the first of which, 11, is open at its lower end and the latter of which is open at its upper end. The edges of said cylindrical portions are provided with inclined edges, as indicated at 13, which are held in contact with each other by means of a pivot-screw 14 or other similar device.

The part 9 of the reproducer-arm is surrounded by a sleeve or bushing 15, which is provided with a flange 16, adapted to abut against the end of the tubular projection 5. The inner end of the bushing 15 is provided with an elongated notch or recess 17, the ends of which are adapted to form stops to limit the movement of a pin 18, carried by the tubular portion 9. This pin 18 prevents the section 9 of the supporting-arm from turning on its axis in either direction beyond certain limits. The outer end of the tubular part 8 is preferably provided with a slightly-enlarged rectangular portion 19, which has an opening 20 in one of the vertical sides thereof. Within this opening 20 is pivoted a short tube 21, which is provided on its inner end with a spherical portion 22, through the vertical axis of which passes a pivot-pin 23, said pivot-pin also entering the wall or side of the rectangular end 19 of the tubular part 8. The sound box or reproducer 24 is firmly attached to the short tube 21 in any suitable manner.

As means for giving the sound-box a positive horizontal movement in a direction transverse to its axis and to hold the same in the correct position in relation to the record-groove I provide a link 25, which is pivoted at one end to a fixed point, preferably on the stationary cylindrical portion 12 of the tubular part 9, as indicated at 26, and at its other end is pivotally attached to a short stud 27, projecting downwardly from the sound-box tube 21.

The positions of the pivot-screw 26 and the stud 27 in relation to the pivots 14 and 23 are such as to form substantially a parallelogram and to give a motion to the tube 22 similar to that produced in the instrument known as the "pantograph." However, the relation between the pivot just mentioned is not exactly a parallelogram, for it will be seen that if such were the case the sound-box and stylus carried thereby would still move in the arc of a circle about the pivot 14. These pivots are therefore arranged in such a manner and the parallelogram is distorted to such an extent as to produce a slight inward transverse movement of the stud 27 and the tube 21, which compensates for the curvature due to the motion of the tubular part 8 in the arc of a circle about the pivot 14. This is accomplished by making the horizontal distance between the pivot-pin 23 and the pivot-stud 27 slightly greater than between the pivot-screws 14 and 26 and also by adjusting the pivot-screw 26 in exactly the right position in relation to the pivot 14.

It will now be seen that when the stylus of the sound-box is placed, as is usually done, at the outer end of the spiral groove on the turn-table said groove will cause the sound-box to move inward toward the center of the record as the record revolves, and such movement, as far as the outer end 8 of the supporting-arm is concerned, will be about pivot 14; but by reason of the fact that the sound-box 24 is pivoted at 23 and also because the tube 21 is rigidly connected with a stationary pivot 26 said sound-box and stylus or needle will be given just sufficient motion in a direction toward the pivot 14 as to compensate for the curvature of the arc, which would otherwise be described about the pivot 14. At the same time, owing to the movement of the sound-box about the pivot 23, the plane of the needle, and consequently the plane of the diaphragm, is always kept tangent to the record-groove at the point of contact of the end of stylus with said groove.

When it is desired to remove a needle from the stylus-bar or replace one there, the tubular part 9 may be rotated upon its axis within the sleeve 15, and the tubular part 8 will thereby be allowed to swing upwardly instead of horizontally. This will present the end of the stylus-bar in a convenient position to have a needle inserted or removed. The rotary motion of the tubular part 9 upon its axis is limited by a pin 18 in a direction when the sound-box is moved downwardly, as well as when raised. The sleeve 15 is made to fit snugly within the tubular projection 5, but is removable therefrom, so that the same may be withdrawn longitudinally and the whole reproducing-arm disconnected from the bracket 4.

Having thus described one embodiment of my invention, it will be seen that various changes may be made in the form, arrangement, and proportion of parts without departing from the spirit and scope of my invention, and it will be obvious that the means for giving the correct motion to the sound-box may be applied to supporting-arms which are not hollow, as well as to the tubular sound-conveying arm; but

What I claim, and desire to protect by Letters Patent of the United States, is—

1. In a talking-machine, the combination with a reproducer and pivoted reproducer-arm swinging in a plane parallel to the face of the record, of means for keeping the stylus of said reproducer substantially tangent with the record-groove as the said reproducer moves across the record.

2. In a talking-machine, the combination with a reproducer, of a swinging reproducer-arm to which said reproducer is pivoted, and means for moving said reproducer about its pivot so as to keep the plane of its stylus substantially tangent to the record-groove as the reproducer moves across the record.

3. In a talking-machine, the combination with a reproducer, of a jointed reproducer-arm having the reproducer pivoted adjacent the end thereof, and means for moving said reproducer upon its pivot so that the plane of its stylus is maintained substantially tangent with the record-groove as the reproducer moves across the record.

4. In a talking-machine, the combination with a reproducer, of a swinging reproducer-arm having the reproducer pivoted adjacent the end thereof, and means connecting said reproducer with a fixed point for moving said reproducer upon its pivot so that the plane of its stylus is maintained substantially tangent with the record-groove as the reproducer moves across the record.

5. In a talking-machine, the combination with a reproducer, of a pivoted reproducer-arm having the reproducer pivoted adjacent the end thereof, means pivotally connected with the reproducer and with a fixed point adjacent the end of the pivot of said reproducer-arm for moving said reproducer about its pivot, so that the plane of its stylus is maintained substantially tangent with the record-groove as the reproducer moves across the record.

6. In a talking-machine, the combination with a reproducer, of a reproducer-arm, a portion of which is fixed and a portion of which is pivoted with the first-named portion, the pivoted portion of said arm having the reproducer pivoted adjacent the end thereof, and means connecting said reproducer and the fixed portion of said arm for moving said reproducer upon its pivot so that the plane of its stylus is maintained substantially tangent with the record-groove as the reproducer moves across the record.

7. In a talking-machine, the combination with a reproducer, of a hollow pivoted tube upon which said reproducer is pivotally mounted, said reproducer having a passage communicating with the interior of said arm, and means for moving said reproducer upon its pivot so that the plane of its stylus is maintained substantially tangent with the record-groove as the reproducer moves across the record.

8. In a talking-machine, with a reproducer, of a hollow jointed reproducer-arm, one portion of which is fixed in a suitable support, the free end of said arm having the sound-box pivotally connected with the end thereof, and having a passage communicating with the interior of said arm, and means for moving said reproducer upon its pivot, so that the plane of its stylus is maintained substantially tangent with the record-groove as the reproducer moves across the record.

9. In a talking-machine, the combination with a reproducer having a short tube connected therewith, of a hollow swinging reproducer-arm having said tube pivoted adjacent the end thereof, said tube having communication with the interior of said arm, and means pivotally attached to said tube, and to a fixed point for moving said reproducer about the pivot of said tube, so that the plane of its stylus is maintained substantially tangent with the record-groove as the reproducer moves across the record.

10. In a talking-machine, the combination with a reproducer, of a short tube attached thereto, of a hollow jointed reproducer-arm having said tube pivoted adjacent the end thereof and having communication with said tube, and a link connecting said tube with the stationary portion of said hollow arm adjacent the axis of said joint for moving said reproducer upon its pivot, so that the plane of its stylus is maintained substantially tangent with the record-groove as the reproducer moves across the record.

11. In a talking-machine, the combination with a reproducer, of a hollow reproducer-arm, comprising two parts, the adjacent ends of said parts terminating in hollow cylindrical boxes having corresponding open ends, one of the parts of said arm having the reproducer pivotally connected therewith, and having the interior thereof in communication with the interior of the sound-chamber of the reproducer, and means connecting said sound-box with one of said cylindrical casings for moving the reproducer upon its pivot so that the plane of its stylus is maintained substantially tangent with the record-groove as the reproducer moves across the record.

12. In a talking-machine, the combination with a reproducer, of a hollow jointed reproducer-arm, a bushing surrounding one of the parts of said arm, rigid supporting means inclosing said bushing, and a stop, the parts of which are carried respectively by said arm and said bushing for limiting the rotary movement of said arm upon its axis.

13. In a talking-machine, the combination with a reproducer, of a hollow reproducer-arm having a joint therein, a fixed support for one part of said jointed arm, a lateral opening adjacent the free end of said arm, a short tube having a spherical end pivoted in said opening, said tube being adapted to carry the reproducer upon its opposite end, and means connecting said tube with the stationary portion of said arm for moving said reproducer upon its pivot, so that the plane of its stylus is maintained substantially tangent with the record-groove as the reproducer moves across the record.

14. In a talking-machine, the combination with a reproducer, of a pivoted reproducer-arm, a support pivoted to said arm to which the reproducer is attached, and a connection between said support and a fixed point, the relation between the pivot of said arm, the pivot of said support, and the ends of said connection forming substantially a parallelogram, so that said reproducer is maintained substantially tangent with the record-groove as the reproducer moves across the record.

15. In a talking-machine, the combination with a reproducer, of a hollow pivoted reproducer-arm, a short tube pivoted adjacent the free end of said arm, and having communication with the interior thereof, the reproducer being carried on the outer end of said tube, and a link pivoted at one end of said tube, and at its other end to a fixed point adjacent the pivot of said hollow arm, the relative positions between said pivots and the pivoted ends of said link being substantially at the corners of a parallelogram, the outer end of which is slightly greater than the inner end so that said reproducer is maintained substantially tangent with the record-groove as the reproducer moves across the record.

16. In a talking-machine, the combination with a reproducer-arm and a bushing surrounding one end of said arm, of a fixed support having a tubular portion with which said bushing is adapted to telescope, and a second tubular portion communicating with the first, the end of said second tubular portion being recessed to receive and communicate with the end of the amplifying-horn and means for securing said horn within said recess.

17. In a talking-machine, the combination with a hollow reproducer-arm, of a fixed support having a tubular extension, a bushing carried by one of the parts of said arm, and within which said arm is rotatably mounted, said bushing being adapted to tightly fit within said tubular projection, an amplifying-horn, and a second tubular projection communicating with the first and adapted to hold and communicate with the end of said amplifying-horn.

18. In a talking-machine, the combination with a swinging or pivotally-mounted reproducer-arm and its coacting pivotally-mounted record-propelled sound-box, of means for guiding the stylus in a radial path across the record-surface.

19. In a talking-machine, the combination of a sound-box carrier, comprising a rigid arm or bracket, an auxiliary arm pivotally attached to one end of said rigid arm, a sound-box pivotally mounted upon the outer end of said auxiliary arm, and a rod or link connected at its outer end with said sound-box, and at its inner end pivotally secured to said carrier near the pivotal point of the auxiliary arm but eccentric thereto.

20. In a talking-machine, the combination of a sound-box carrier, comprising a rigid hollow arm or bracket, an auxiliary hollow arm pivotally attached at one end to said rigid arm, and having communication therewith, a sound-box pivotally mounted upon the outer end of said auxiliary arm, and having communication therewith, and a rod or link connected at its outer end with said sound-box, and at its inner end pivotally secured to said carrier near the pivotal point of said auxiliary arm but eccentric thereto.

In witness whereof I have hereunto set my hand this 10th day of November, 1904.

JOHN C. ENGLISH.

Witnesses:
   JOHN F. GRADY,
   HARRY COBB KENNEDY.